United States Patent Office 3,540,949
Patented Nov. 17, 1970

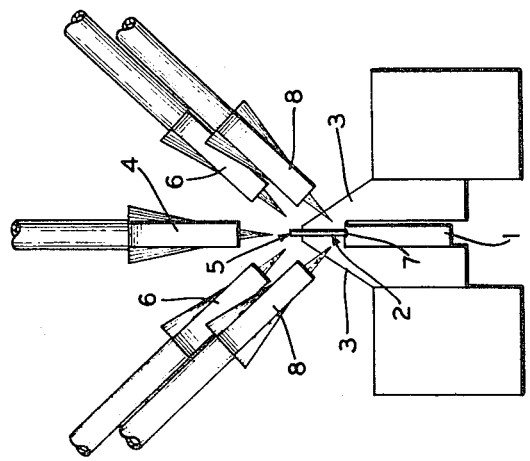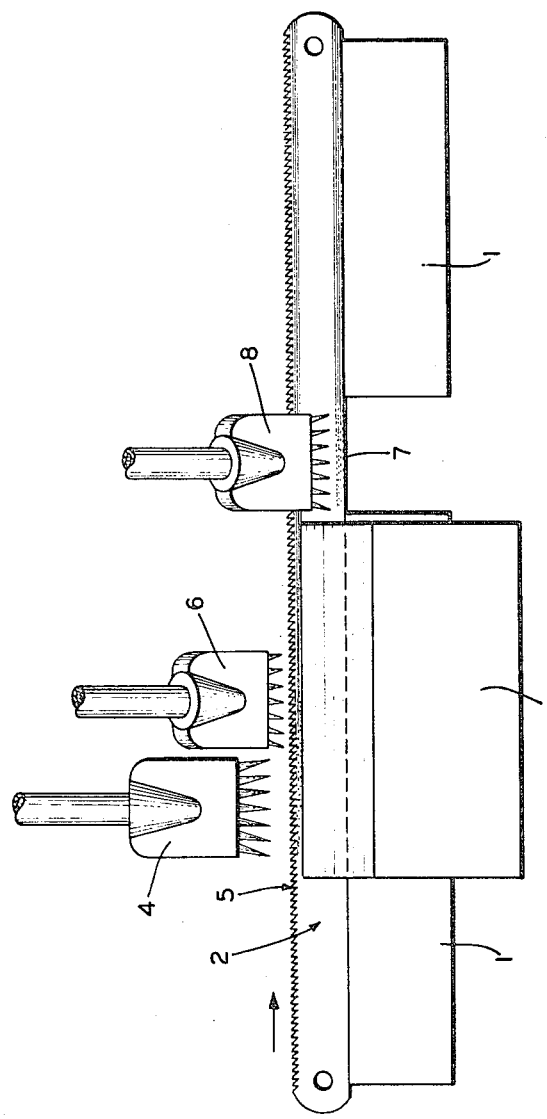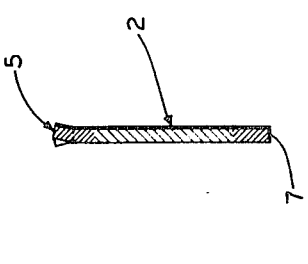

3,540,949
METHOD OF HEAT TREATING A
HACKSAW BLADE
Joseph R. Gill, 5140 12th St. SW.,
Canton, Ohio 44710
Filed Oct. 3, 1966, Ser. No. 583,798
Int. Cl. C21d 1/08, 1/52
U.S. Cl. 148—134   5 Claims

ABSTRACT OF THE DISCLOSURE

A method of heat treating hacksaw blades which includes the steps of passing the elongated hacksaw blade in a longitudinal direction with its cutting edge upward between two or more downwardly converging heat sources, directing the heat sources at the gullets of the teeth formed on the cutting edge of the hacksaw blade, applying an equal amount of heat to the back portion of the hacksaw blade by moving the blade between similar downwardly converging burners directed at the back of the blade, and subsequently tempering said blade.

---

The customary manner of heat treating flexible hand hacksaw blades is to move the blade longitudinally between cooling blocks or other heat-absorbent means while applying high temperature heat from a burner or the like directly to the cutting edge only of the blade.

The exact temperature depends upon the particular type of steel of which the blade is formed. The cutting edge of the blade is thus heat treated to a maximum hardness, while the body of the blade remains in its soft condition. After the heat-treated blade is properly tempered, it is a flexible hand hacksaw blade with a hard cutting edge.

This application of high heat directly on the tips or cutting edges of the teeth may cause tooth crest, i.e., melting of the cutting edge, or may result in burning of the teeth.

Furthermore, the application of the high heat to the cutting edge only produces a bow in the blade as a result of the heat-treated cutting edge contracting upon cooling. A hacksaw blade is very flexible and must be tightened very tightly in a hand frame to assure maximum rigidity. The bow in the blade requires that it must be tightened even more to make it rigid.

A general object of the present invention is to overcome the above disadvantages and difficulties.

Another object of the invention is to provide a novel method of heat treating hacksaw blades, which includes heat treating the back edge of the blade, the same as the cutting edge thereof.

A further object of the invention is to provide a flexible hacksaw blade having a hard cutting edge and an equally hard back edge.

A still further object of the invention is to provide such a method in which the cutting edge of the blade is first pre-heated by relatively low temperature burner means and then heat treated with two or more high heat burners, while the back edge of the blade is heated with equally high temperature burner means.

Another object of the invention is to provide a method of the character referred to in which the saw teeth are heat treated by heat dissipation, the heat being trapped in the teeth so that they harden without a direct flame and there is no cresting or burning.

A further object of the invention is to provide a method for heat treating a hacksaw blade in which the saw blade is moved longitudinally in a substantially horizontal direction between a pair of cooling blocks, the cutting edge of the blade protruding a short distance above the cooling blocks, the preheating burner means and the high heat burners for heat treating the cutting edge being located above the cooling blocks, a high heat flame being directed upon the back edge of the saw blade beyond the cooling blocks.

It is also an object of the invention to provide a method of the character referred to in which the high heat burners for heating the cutting edge of the saw teeth direct the focal point of the flame at the bottom of the saw teeth, the heat being conducted to the cooling blocks and out to the tips of the teeth.

These and other objects, apparent from the drawing and following description, may be attained, the above described difficulties overcome and the advantages and results obtained, by the methods, steps, procedures, modes of operation which comprise the present invention, a preferred embodiment of which, illustrative of the best mode in which applicant has contemplated applying the principle, being set forth in detail in the following description and illustrated in the accompanying drawing.

In general terms the invention may be briefly described as a method of heat treating hacksaw blades, which comprises longitudinally moving a hacksaw blade with the cutting edge upward, beneath a relatively low temperature preheating burner, and then between two or more downwardly converging high heat burners to apply heat to the gullets or roots of the teeth, the blade at this point passing between two cooling blocks or the like, and then applying the same high temperature to the back edge of the moving blade by equalizing burners to produce a straight hacksaw blade with hardened cutting edge and equally hardened back edge, as well as the heat-hardened hacksaw blade produced by this method.

In the drawing:

FIG. 1 is a side elevation of equipment by means of which the method may be performed;

FIG. 2 is an end elevation of the equipment shown in FIG. 1;

FIG. 3 is a side elevation of a hacksaw blade heat treated by the improved method; and, FIG. 4 is an enlarged transverse sectional view through the hacksaw blade shown in FIG. 3.

In FIGS. 1 and 2 is shown equipment by means of which the heat-treating method embodying the invention may be performed. This equipment comprises spaced guides 1 upon which a saw blade, indicated generally at 2, may be longitudinally moved substantially horizontally in the direction of the arrow shown in FIG. 1 between a pair of cooling blocks 3.

One or more preheating burners 4 directs a flame onto the cutting edge of the blade, indicated generally at 5, at or near the point where the blade enters between the cooling blocks 3. This preheating burner has a relatively low temperature flame as compared with the heat-treating burners to be later described. As an example, the flame temperature of the preheating burner 4 may be approximately 1000° F.

Directly beyond the preheating burner 4 is located one or more pairs of high temperature heat-treating burners 6 which, as best shown in FIG. 2, direct the focal points of the flames at the roots or gullets of the saw teeth. The temperature of the flames of these heat-treating burners depends upon the particular type of steel of which the saw blade is made, but in any case the temperature is high relative to that of the preheating burner 4.

Beyond the cooling blocks 3, burner means is provided for heat treating the back edge 7 of the saw blade. For this purpose, preferably a pair of angularly inclined burners 8 are provided, one upon each side of the saw blade 2, each burner directing its flame downward toward the back edge 7 of the blade.

Although the back edge of the blade may be heated by a single burner directing the flame upward against the same, cooling blocks will be required for the blade. For this reason the downwardly disposed burners at each side are preferred.

The burners 8 are equalizing heat-treating burners producing a flame of the same temperature as the high heat-treating burners 6, which heat treat the toothed edge of the blade. All of the burners are adjustable for temperature to suit conditions and to compensate for the required temperature to harden and to equalize the bow.

In performing the method of heat treating to which the invention pertains, a hacksaw blade 2 with the cutting edge 5 upward, is moved longitudinally, in a generally horizontal position, in the direction of the arrow shown in FIG. 1, moving between the cooling blocks 3, first beneath the preheating burner 4 and then between the flames of the high temperature, heat-treating burners 6, which are directed at the gullets or roots of the saw teeth rather than against the tips of the teeth as in conventional practice.

The heat is conducted to the cooling blocks 3 and out to the tips of the teeth. This is heat treating by heat dissipation, the heat being trapped in the teeth so that they harden without a direct flame and there is no cresting or burning of the teeth. The wide high heat is accomplished by the heat dissipation process.

After passing through the cooling blocks 3, the saw blade moves through the downwardly directed hardening flames from the burners 8, which are directed downward against the back edge 7 of the blade. The hardening burners 8 heat the back edge 7 of the blade to the same temperature as the toothed edge 5 thereof is heated by the burners 6.

The purpose and use of the hardening burners 8 on the back edge of the blade is to allow a wide preheat and high heat area on the cutting edge thereof and to equalize the bow strains while heat treating the back edge to maximum hardness.

After being subjected to this heat-hardening process, the blade is then tempered at the proper temperature as required by the particular type of steel of which it is formed.

The heat-treated back edge of the blade provides a straight, flexible hand hacksaw blade with highly improved body strength and stiffness and entirely eliminates the bow produced in hacksaw blades by conventional hardening methods.

By heat treating the back edge of the blade the same as the cutting edge, the heat-treated back edge produces an equal amount of cooling strains on the back, and when the blade cools it remains in its original straight position. With a hard cutting edge and a hard back edge the blade is much more rigid and can take greater cutting pressure.

The above described method produces a straight, flexible hand hacksaw blade having hard cutting edge and hard back edge with highly improved stiffness and rigidity and with no cresting or burning of the teeth.

In the foregoing description certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful construction, and reasonable mechanical equivalents thereof obvious to those skilled in the art, are set forth in the appended claims.

I claim:

1. The method of heat treating a steel hacksaw blade having a toothed cutting edge and a back edge which includes the steps of heating the cutting edge of the blade to proper heat treat temperature by passing the blade between downwardly converging high temperature flames the focal points of which are directed only at the gullets or roots of the teeth, said heating being sufficient to harden the cutting edge to the proper hardness for the material involved by heat dissipated from said gullet or root portions, and heating the back edge of the blade to a similar high temperature by passing the blade between downwardly converging high temperature flames directed at the back edge of the blade to harden the back edge to a degree of hardness substantially the same as the cutting edge, while maintaining the central portion of the blade in relatively soft condition.

2. The method of heat treating a steel hacksaw blade as defined in claim 1 in which the cutting edge of the blade is first preheated to a preselected temperature by directing a preheat heat source at the cutting edge of the blade.

3. The method of heat treating a steel hacksaw blade as defined in claim 1 in which the heat treated blade is subsequently tempered.

4. The method of heat treating a steel hacksaw blade as defined in claim 2 in which the blade is subsequently tempered.

5. The method of heat treating a steel hacksaw blade as defined in claim 1 in which the blade passes between cooling blocks while the cutting edge is subjected to the high temperature heat source.

References Cited
UNITED STATES PATENTS

| | | | |
|---|---|---|---|
| 1,333,767 | 3/1920 | Napier | 148—149 X |
| 2,312,839 | 3/1943 | Kullman et al. | 148—149 |
| 2,326,674 | 8/1943 | Pavitt | 148—147 |
| 2,327,129 | 8/1943 | Ronan | 148—147 |
| 2,786,788 | 3/1957 | Anderson | 148—147 |

CHARLES N. LOVELL, Primary Examiner

U.S. Cl. X.R.

148—137, 148, 151